(12) United States Patent
Nakamura

(10) Patent No.: US 10,591,813 B2
(45) Date of Patent: Mar. 17, 2020

(54) ILLUMINATION APPARATUS AND IMAGE PROJECTION APPARATUS

(71) Applicant: CANON KABUSHIKI KAISHA, Tokyo (JP)

(72) Inventor: Tomohiro Nakamura, Yoshikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/255,027

(22) Filed: Jan. 23, 2019

(65) Prior Publication Data

US 2019/0235374 A1    Aug. 1, 2019

(30) Foreign Application Priority Data

Jan. 26, 2018    (JP) .................................. 2018-011506

(51) Int. Cl.
*G03B 21/20* (2006.01)
*G02B 27/28* (2006.01)

(52) U.S. Cl.
CPC ..... *G03B 21/2093* (2013.01); *G03B 21/2073* (2013.01)

(58) Field of Classification Search
CPC ................ G03B 21/20; G03B 21/2053; G03B 21/2073; G03B 21/2093; G03B 33/12; G02B 27/28; G02B 27/283; G02B 27/286; G09G 3/34; G09G 3/3406; G09G 3/3413

See application file for complete search history.

(56) References Cited

U.S. PATENT DOCUMENTS

| 2005/0157310 A1* | 7/2005 | Kim .................... G01B 9/02019 356/510 |
| 2008/0117386 A1* | 5/2008 | Mizouchi ............... G03B 33/12 353/34 |
| 2008/0117836 A1* | 5/2008 | Savoor ................ H04L 41/0896 370/254 |
| 2009/0128451 A1* | 5/2009 | Tokui ..................... G03B 33/08 345/55 |
| 2011/0043712 A1 | 2/2011 | Yamakawa |
| 2013/0070208 A1* | 3/2013 | Nakanishi .............. G03B 21/16 353/31 |
| 2013/0229628 A1 | 9/2013 | Akiyama et al. |
| 2018/0240338 A1* | 8/2018 | Hue ......................... B60Q 1/50 |

FOREIGN PATENT DOCUMENTS

| JP | H11065528 A | 3/1999 |
| JP | 2007052299 A | 3/2007 |
| JP | 2016145936 A | 8/2016 |
| WO | 2007023681 A1 | 3/2007 |

OTHER PUBLICATIONS

Extended European Search Report issued in European Appln. No. 19153065.8 dated Mar. 26, 2019.

* cited by examiner

*Primary Examiner* — Thai Pham
(74) *Attorney, Agent, or Firm* — Rossi, Kimms & McDowell LLP

(57) ABSTRACT

An illumination apparatus includes a light source, a polarization conversion element configured to convert light from the light source into polarized light having a specific polarization direction and to emit the polarized light to an illumination surface, and a photosensor configured to receive light emitted from a surface different from an incident surface and an exit surface of the polarization conversion element.

8 Claims, 4 Drawing Sheets

REFLECTANCE OF REFLECTION FILM

TRANSMITTANCE OF SECOND SEPARATION FILM

ILLUMINATION APPARATUS AND IMAGE PROJECTION APPARATUS

BACKGROUND OF THE INVENTION

Field of the Invention

The present invention relates to an illumination apparatus, such as an image projection apparatus (projector).

Description of the Related Art

Some projectors use a laser for a light source, such as a projector that generates white light as illumination light using a plurality of lasers that emit red light, green light, and blue light, respectively, and a projector that irradiates a blue laser beam onto a fluorescent material (fluorescent body, phosphor) and converts part of it into yellow light. The brightness may decrease or the color (white balance) may change in the white light as the transmittance lowers in an optical element that receives the high-intensity laser beam, as the fluorescent material deteriorates, and the like.

Each of WO2007/023681, Japanese Patent Laid-Open No. ("JP") 2007-052299, and JP 11-065528 discloses a projector that detects the brightness and color changes through a photosensor and corrects these changes. The projector disclosed in WO2007/023681 detects unnecessary light from a mirror array device as a light modulation element through the photosensor, and controls the output of the light source according to the detection result. The projector disclosed in JP 2007-052299 detects the first order diffracted light from the hologram element through the photosensor, and controls the output of the light source according to the detection result. The projector disclosed in JP 11-065528 receives a small amount of diffused light from a fly's eye lens through which the light from the light source transmits, through a three-primary-colors photosensor, and controls an output of a light source in accordance with an output from the photosensor.

In the projector disclosed in WO2007/023681, the light incident on the photosensor is unnecessary light reflected by the light modulation element, and significantly varies depending on the displayed image. In other words, even when this light is received by the photosensor, the light change itself from the light source cannot be detected.

The projector disclosed in JP 2007-052299 adds the hologram element that allows the photosensor to receive the light. The light among the light from the light source, which is converted into the first order diffracted light by the hologram element, does not reach the light modulation element, and thus the brightness of the displayed image reduces.

The projector disclosed in JP 11-065528 needs to dispose the three-primary-colors photosensor so that the photosensor can surely receive the diffused light from the fly's eye lens without shielding the effective light flux to reach the light modulation element, but the installation is not easy.

SUMMARY OF THE INVENTION

The present invention provides an illumination apparatus and an image projection apparatus using the same, in which a photosensor is easily installed and which can detect the brightness and color of the light from a light source without adding a new optical element.

An illumination apparatus according to one aspect of the present invention includes a light source, a polarization conversion element configured to convert light from the light source into polarized light having a specific polarization direction and to emit the polarized light to an illumination surface, and a photosensor configured to receive light emitted from a surface different from an incident surface and an exit surface of the polarization conversion element.

An image processing apparatus according to another aspect of the present invention includes the above illumination apparatus, a light modulation element disposed on the illumination surface and configured to modulate light from the polarization conversion element and to generate image light, and a controller configured to control at least one of the light source and the light modulation element based on an output from the photosensor.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
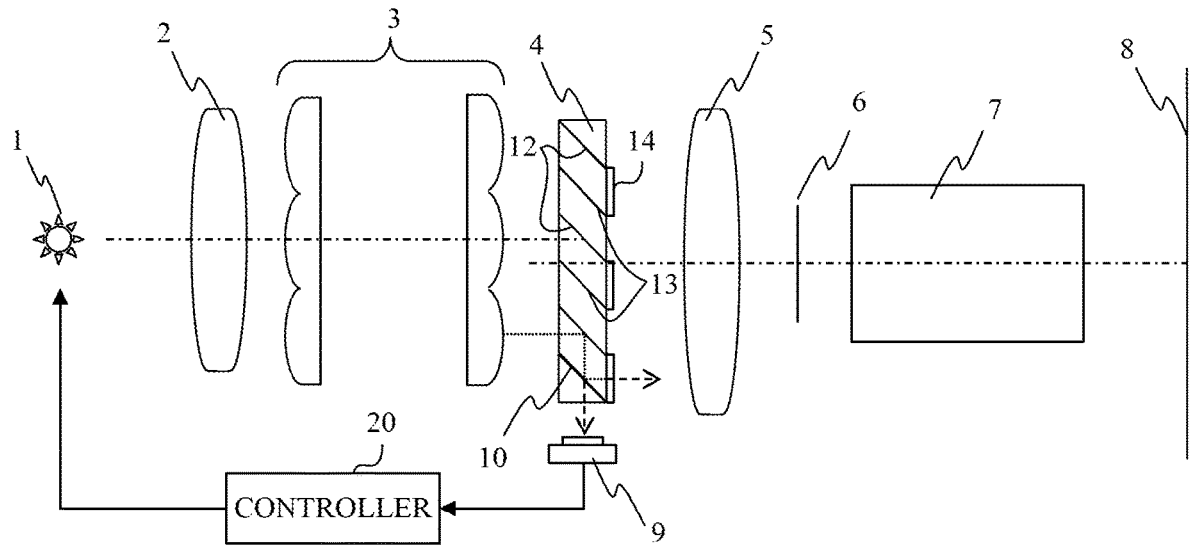
FIG. 1 illustrates a configuration of a projector according to a first embodiment of the present invention.

FIG. 1 illustrates a configuration of an image projection apparatus (referred to as a "projector" hereinafter) including an illumination apparatus according to a first embodiment of the present invention. The illumination light emitted from a light source 1 illuminates a light modulation element 6 disposed on an illumination surface via the illumination optical system. The illumination optical system includes a collimator lens 2, first and second fly-eye lens arrays 3 as equalizers, and a PBS array 4 as a polarization conversion element. The light source 1 and the illumination optical system constitute an illumination apparatus.

The illumination light entering the light modulation element 6 is modulated by the light modulation element 6 according to an image signal input to the projector, and becomes modulated light (image light having image information). The light modulation element 6 includes a transmissive or reflective liquid crystal panel. The modulated light emitted from the light modulation element 6 is projected onto a projection surface 8, such as a screen, via the projection optical system 7.

The light source 1 includes three laser diodes ("LDs") that emit red, green and blue laser beams (simply referred to as red light, green light, and blue light hereinafter) respectively, and these red light, green light, and blue light and generates white light by combining these light beams with one another. The light source 1 may generate the white light by irradiating blue light onto a fluorescent material to convert part of the blue light into yellow light (green light+red light), and by combining the blue light and yellow light with each other.

The white light as divergent light emitted from the light source 1 is collimated by the collimator lens 2, is divided into a plurality of light fluxes by the fly-eye lens arrays 3, and enters the PBS array 4. The PBS array 4 converts unpolarized light from the light source 1 into polarized light having a specific polarization direction. The plurality of light beams emitted from the PBS array 4 are condensed by the condenser lens 5 and superimposed on the light modulation element 6. Thereby, a modulation surface of the light modulation element 6 is illuminated with a uniform light intensity.

Figure 3:
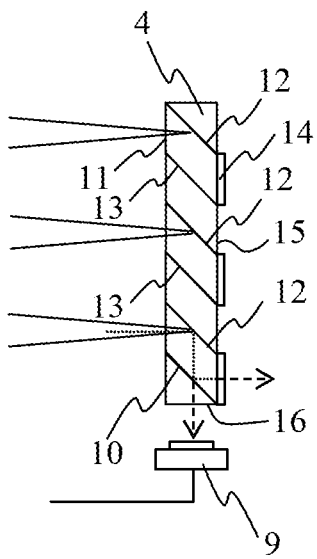
FIG. 3 illustrates a configuration of a PBS array used for the projector according to the first embodiment.

FIG. 3 illustrates a configuration of the PBS array 4. According to this embodiment, the PBS array 4 converts the unpolarized light into P-polarized light and emits it, but it may convert it into S-polarized light and emit it.

The PBS array 4 includes a plurality of first polarization separation films 12 each inclined by an angle of 45° to an incident light beam and arrayed in a vertical direction (specific direction) in the figure, a plurality of reflection films 13 arranged between the first polarization separation elements 12, and a plurality of half waveplates 14.

The light flux (unpolarized light) condensed by each lens cell in the fly's eye lens arrays enters the PBS array 4 from its incident surface 11. Most of the P-polarized light among the unpolarized light passes through the first polarization separation film 12, and most of the S-polarized light is reflected by the first polarization separation film 12. The first polarization separation film 12 has a film characteristic (polarization separation characteristic) in which the reflectance for the S-polarized light is higher than that for P polarized light.

The P-polarized light that has transmitted through the first polarized light separation film 12 passes through an exit surface 15 from the PBS array 4 as it is and travels toward the condenser lens 5 (and the illumination surface). The S-polarized light reflected by the first polarization separation film 12 is reflected by the reflection film 13, its polarization direction is rotated by 90° so that the S-polarized light is converted into the P-polarized light by the half waveplate 14 provided on the exit surface 15, and the P-polarized light travels to the condenser lens 5. Thus, the unpolarized light incident on the PBS array 4 is converted into the P-polarized light and emitted from the PBS array 4. The exit surface 15 is a surface for emitting an effective light flux (P-polarized light) that is to enter the light modulation element 6 disposed on the illumination surface via the condenser lens 5.

The PBS array 4 includes a second polarization separation film 10 inclined by 45° to the incident light flux at a position closer to the lower end (the end in the specific direction) than the plurality of first polarization separation films 12. No reflection film 13 is provided between the first polarization separation film 12 at the lowest end and the second polarization separation film 10. The film characteristic (reflectance and transmittance) of the second polarization separation film 10 for the P-polarized light and S-polarized light may be the same as that of the first polarization separation film 12, but may be set so as to satisfy the following expressions (1).

The second polarization separation film 10 has a surface different from the incident surface 11 and the exit surface 15 in the PBS array 4, and disposed near a detection surface (surface) 16 as the lowest end surface (lowest side surface) of the PBS array 4. A photosensor 9 is disposed near the detection surface 16. The photosensor 9 receives light (detection light) that has been reflected by the first polarization separation film 12 at the lowest end, transmitted through the second polarization separation film 10, passed through the detection surface 16 serving as a transmission surface and as a diffusion surface, and been emitted from the detection surface 16. Since the light passing through the polarization separation film is more than the light passing through the reflection film, this embodiment can stably detect a light amount through the photosensor 9 without being affected by noises.

Since the detection surface 16 is a diffusion surface, a wide permissible error range can be maintained in disposing the photosensor 9 for the PBS array 4 without a new diffusion plate, and it becomes easier to install the photosensor 9.

While the reflection film is disposed at the position of the second polarization separation film 10 in the conventional PBS array, this embodiment disposes the second polarization separation film 10. A light amount that transmits through the second polarization separation film 10 and is received by the photosensor 9 is a small amount among the light amount incident on the PBS array 4 and little affects the brightness of the displayed image projected by the projector. The light incident on the PBS array 4 has a Gaussian distribution, and the light entering the photosensor 9 is part of the light from the first polarization separation film 13 closest to the photosensor 9 and occupies a small amount in the light amount entering the PBS array 4.

Figure 2:
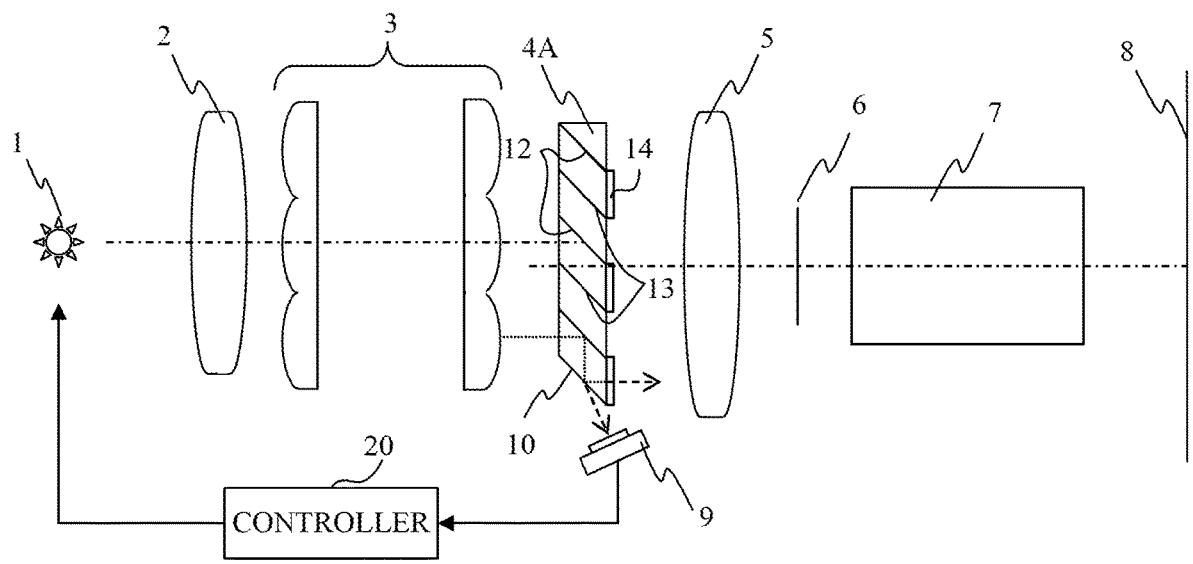
FIG. 2 illustrates a configuration of another projector according to the first embodiment.

FIG. 2 illustrates a PBS array 4A different from the PBS array 4 illustrated in FIG. 1. In the PBS array 4A, the second polarization separation film 10 exposed outside (exposed to the air) serves as a detection surface. In FIG. 2, the photosensor 9 is disposed such that its light receiving surface faces a direction different from the direction of the light modulation element 6. This configuration can prevent unnecessary diffracted light from the light modulation element 6 and return light corresponding to the displayed image from entering the photosensor 9.

In any of the configurations illustrated in FIGS. 1 and 2, the photosensor 9 photoelectrically converts the received light and outputs detection information corresponding to the intensity and color of the light. Using this detection information, the controller 20 controls at least one of the light source 1 and the light modulation element 6. More specifically, when the color (white balance) of the illumination light from the light source 1 deviates from the reference white balance in the factory shipment of the projector, the output (light emission intensity) of the light source 1 is changed or the gain of the light modulation element 6 for the gradation of the image signal is changed. This configuration can stably maintain the brightness and white balance of the illumination light or the brightness and color balance of the displayed image projected by the projector for a long use time.

One reason why the white balance of the illumination light from the light source 1 deviates from the reference white balance is that the optical element provided in one of three types of lasers emitting red, green, and blue laser beams deteriorates in the light source using the three types of lasers. The laser beam with a high light density emitted from the laser contaminates the surface of the optical element that receives the laser beam. In addition, dust may be heated by the laser beam and sintered on the surface of the optical element.

Another reason is that in generating the white light by irradiating the blue laser beam onto the fluorescent material and by converting part of it into the yellow light, the wavelength conversion efficiency in the fluorescent material may change according to the intensity of the laser beam irradiated onto the fluorescent material. The higher the light intensity of the blue laser beam irradiated onto the fluorescent material, the lower the wavelength conversion efficiency to the yellow light and the more bluish the illumination light is generated. The fluorescent material includes the inorganic fluorescent powder and organic binder, and the organic binder deteriorates over time when receiving the laser beam with a high intensity. As a result, the white balance of the illumination light is destroyed.

Since the white balance of the illumination light is destroyed by this cause, it is necessary to detect a light amount change of each of the red light, the green light, and the blue light using the photosensor 9.

Figure 4:
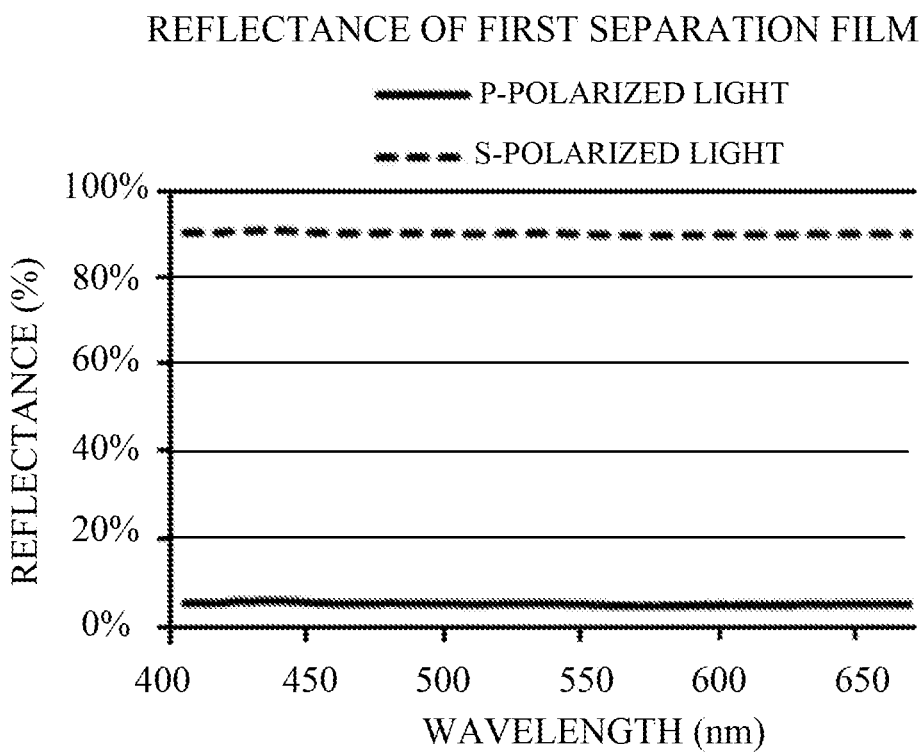
FIG. 4 is a graph illustrating a characteristic of the polarization separation film in a (polarization beam splitter ("PBS")) array according to the first embodiment.

Next follows a description of the film characteristics of the first polarization separation film 12, the reflection film 13, and the second polarization separation film 10 in the PBS array 4 (and 4A). FIG. 4 illustrates the reflectance of the first polarization separation film 12 for the P-polarized light and S-polarized light (or the light amounts of the P-polarized light and the S-polarized light reflected by the polarization separation film 12). The first polarization separation film 12 has a reflectance of 90% or higher for the S-polarized light and a reflectance of 5% or less for the P-polarized light.

Figure 5:
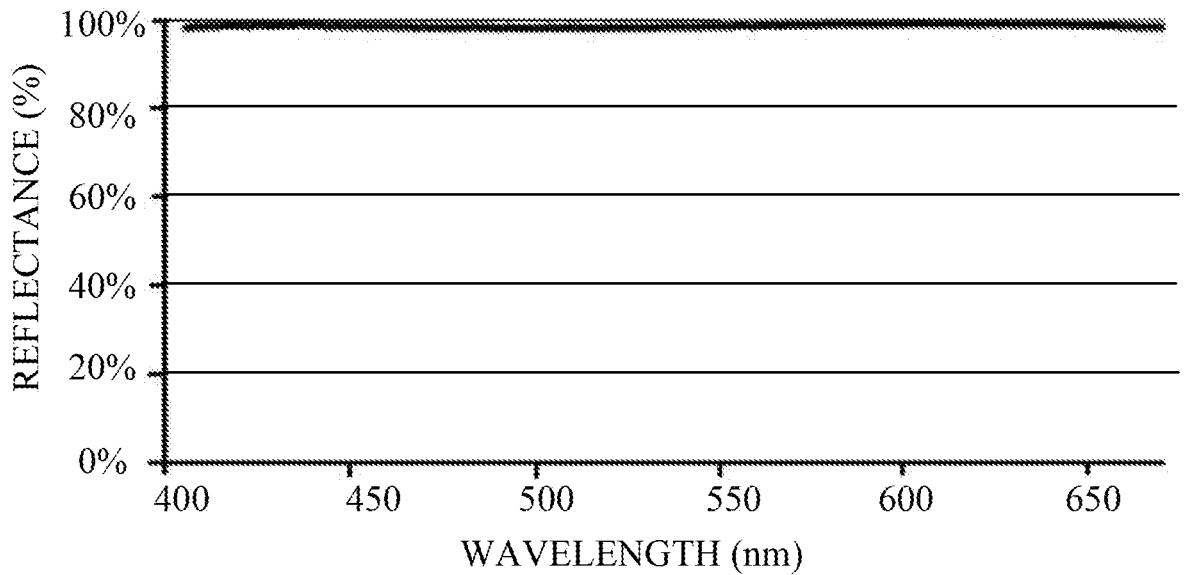
FIG. 5 is a graph illustrating a characteristic of a reflection film in the PBS array according to the first embodiment.

FIG. 5 illustrates the reflectance of the reflection film 13. Regardless of the polarization direction, the reflection film 13 has a reflectance close to 100%.

As described above, the reflection film 13 is disposed at the position of the second polarization separation film 10 in the conventional PBS array. When the reflection film 13 is disposed at this position, the photosensor 9 receives a large amount of the S-polarized light and a small amount of the P-polarized light reflected by the first polarization separation film 12 facing the reflection film 13 while the light amount ratio illustrated in FIG. 4 is substantially maintained. As illustrated in the figure, the amounts of the S-polarized light and the P-polarized light reflected by the first polarization separation film 12 are significantly different from each other. Depending on the polarization states of the red light, the green light, and the blue light entering the first polarization separation film 12 in the PBS array 4, the light amounts of the respective color light fluxes received by the photosensor 9 are significantly different.

In general, the photosensor configured to provide a photoelectric conversion of the red light, the green light, and the blue light can control the gain according to the received light amount. When a light amount of certain color light is excessively larger or smaller than that of other color light, the photosensor is saturated or contains more noises and suffers from the degraded detection accuracy, because no gain control with a small size is available for each color light. It is thus necessary to maintain the respective light amounts of the red light, the green light, and the blue light within specific ranges.

Figure 6:
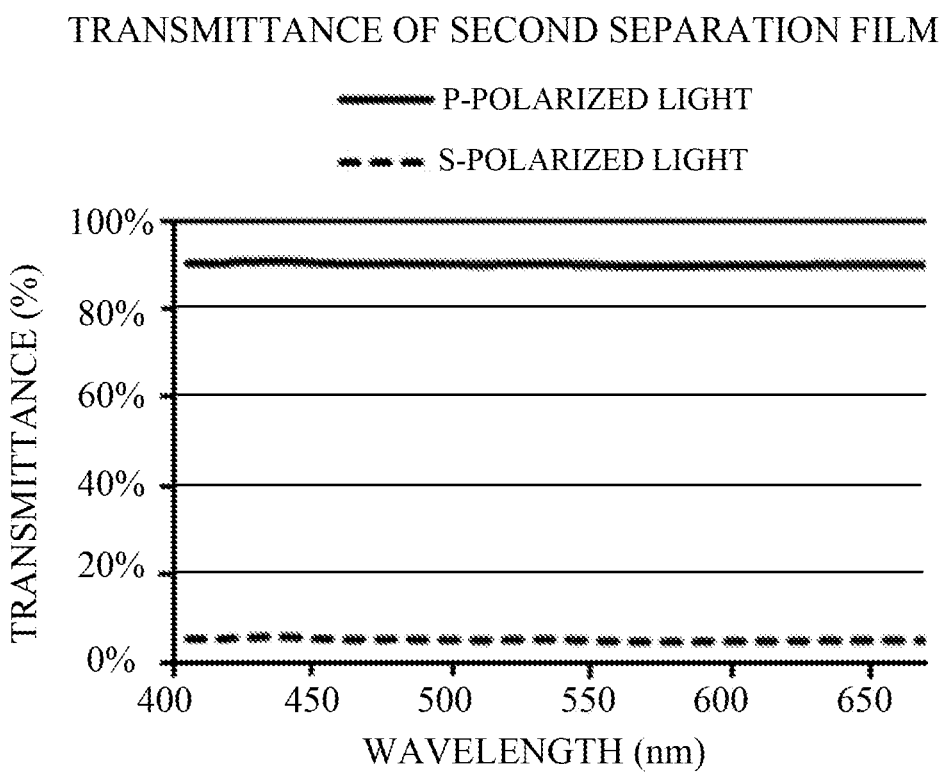
FIG. 6 is a graph illustrating a characteristic of a detection film in the PBS array according to the first embodiment.

Accordingly, this embodiment sets the light received by the photosensor 9 to the light that has transmitted through the second polarization separation film 10. FIG. 6 illustrates the transmittance of the second polarization separation film 10 for the P-polarized light and the S-polarized light (or the light amounts of the P-polarized light and the S-polarized light passing through the second polarization separation film 10). The second polarization separation film 10 has a transmittance of 5% or less for the S-polarized light and a transmittance of 90% or higher for the P-polarized light.

As understood from a comparison among FIG. 6, FIG. 4, and FIG. 5, this embodiment can make equal a light amount ratio among the red light, the green light, and the blue light that transmits through the second polarization separation film 10 and is received by the photosensor 9 (RGB ratio) to the RGB ratio of the effective light fluxes emitted from the emission surface 15. The equal RGB ratios, as used herein, need not be exactly equal but may allow for a permissible range that can be considered equal (such as a difference of 10% between them).

In particular, in generating the white light by irradiating the blue light onto a fluorescent material and by converting part of it into the yellow light, the blue light mixed with the yellow light uses the blue light not irradiated onto the fluorescent material (laser beam) or blue light irradiated onto the fluorescent material but not wavelength-converted. Since the polarization state of the blue light is different from that of the yellow light, the light amount of the blue light reflected by the first polarization separation film 12 in the PBS array 4 is larger or smaller than that of the yellow light.

According to this embodiment, the blue light incident onto the PBS array 4 includes a large amount of the S-polarization component, and the yellow light is unpolarized light. Thus, most of the blue light is reflected by the first polarization separation film 12, and almost half of the yellow light passes through the first polarization separation film 12 and exits from the exit surface 15. Since the light amount of the blue light incident on the second polarization separation film 10 is larger than that of the yellow light, the second polarization separation film 10 needs to have a film characteristic of reflecting most of the blue light.

In other words, when a light amount of the blue light, which is the first color light out of the blue light and the yellow light reflected by the first polarization separation film 12, is smaller than that of the blue light passing through the first polarization separation film 12, the light amount of the blue light reflected by the second polarization separation film 10 needs to be smaller than that of the blue light passing through the polarization separation film 10.

This embodiment discusses a case where the blue light entering the PBS array 4 is the S-polarized light. When the blue light is the P-polarized light, the second polarization separation film 10 has a film characteristic that transmits most of the blue light.

In other words, when a light amount of the blue light as the first color light reflected by the first polarization separation film 12 is larger than that of the blue light passing through the first polarization separation film 12, the light amount of the blue light reflected by the second polarization separation film 10 needs to be larger than that of the blue light transmitting through the second polarization separation film 10.

While the ideal film characteristic of the PBS array 4 has been described so far, it is actually difficult to make equal the ratio among the effective light fluxes emitted from the emission surface 15 of the PBS array 4 to the RGB ratio among the light fluxes received by the photosensor 9 due to the manufacturing errors of the film or the like.

Accordingly, this embodiment sets the film characteristic of the second polarization separation film 10 in order to maintain the light amounts of the red light, the green light, and the blue light received by the photosensor 9 within a specific range in which the degraded detection accuracy caused by the saturation and noises is permissible. More specifically, this embodiment sets the film characteristic of the second polarization separation film 10 so as to satisfy the condition expressed by the following expressions (1) for each of the red light, the green light, and the blue light.

Assume that R1(%) is a ratio of a reflected light amount (emitted light amount) to an incident light amount of the P-polarized light as the first polarized light in the first polarization separation film 12, R2(%) is a ratio of a reflected light amount to an incident light amount of the S-polarized light as the second polarized light, and R1 is smaller than R2 (R1<R2). Then, T1(%) as a ratio of the transmission light amount (exit light amount) to the incident light amount of the P-polarized light in the second polarization separation film 10 and T2(%) as a ratio of the transmission light amount to the incident light amount of the S-polarized light in the second polarization separation film 10 satisfy the following condition:

$$0.8 \times R2 \leq T1 \leq 1.2 \times R2$$

$$0.7 \times R1 \leq T2 \leq 1.3 \times R1 \quad (1)$$

Satisfying this condition can avoid the detection accuracy of the RGB ratio of the photosensor 9 from degrading.

This embodiment uses the LD as the light source 1, but may use a solid laser emitting YAG double harmonic or the like and a gas laser such as an Argon laser.

Second Embodiment

Figure 7:
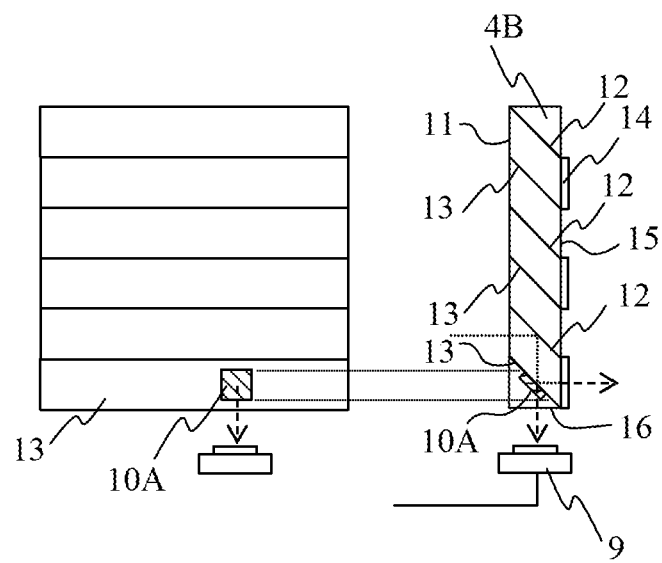
FIG. 7 illustrates a configuration of a PBS array used for a projector according to a second embodiment of the present invention.

FIG. 7 illustrates a configuration of a PBS array 4B used for a projector according to a second embodiment of the present invention. The first embodiment provides the second polarization separation film 10 in place of the reflection film 13 in the PBS array 4. However, the PBS array 4B according to this embodiment provides the second polarization separation film 10A together with the reflection film (referred to as a "lower end reflection film" hereinafter) 13 closest to the detection surface 16 among the plurality of reflection films 13. More specifically, a partial area of the lower end reflection film 13 is replaced with the second polarization separation film 10A having the film characteristic described in the first embodiment. This configuration can guide the light flux reflected by the lower end reflection film 13 to the light modulation element 6, and introduce a larger amount of the effective light flux than that in the first embodiment to the light modulation element 6 while a light amount received by the photosensor 9 little changes.

Figure 8:
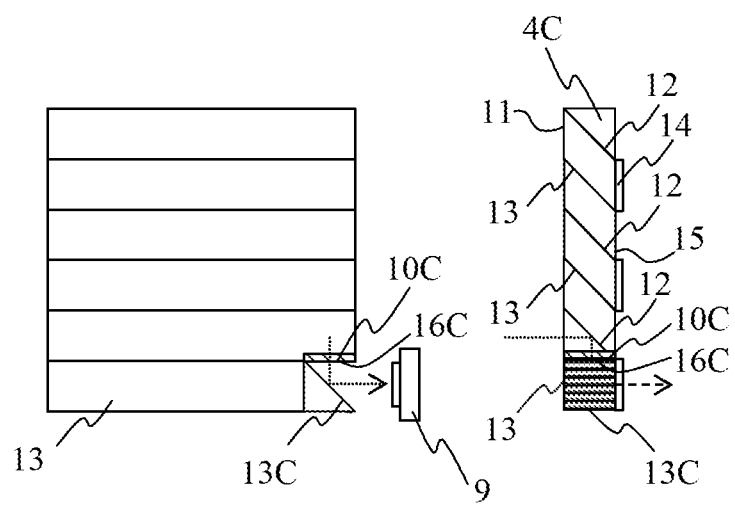
FIG. 8 illustrates a configuration of another PBS array according to the second embodiment.

The PBS array 4C illustrated in FIG. 8 may be used. The PBS array 4C has cut part of the lower end portion, which is an end in the vertical direction (specific direction) in the drawing, and a detection surface 16C orthogonal to the incident surface 11, the output surface 15, and the specific direction. The detection surface 16C has the second polarization separation film 10C having the same film characteristic as that of the second polarization separation film 10 described in the first embodiment. One (or lower end reflection film) of the plurality of reflection films 13 is provided to part other than the cut part at the lower end portion of the PBS array 4C.

A reflection film (mirror) 13C configured to reflect the light emitted from the second polarization separation film 10C is provided at a position facing the detection surface 16C. The photosensor 9 receives the light reflected by the reflection film 13C toward the side of the PBS array 4C (direction orthogonal to the optical axis in the illumination optical system). The photosensor 9 is disposed on the side of the PBS array 4C so as not to shield the effective light flux emitted from the exit surface 15 of the PBS array 4C.

According to the configurations described in the first embodiment and the second embodiment, the photosensor 9 is less likely to be influenced by unnecessary diffracted light from the light modulation element 6, return light corresponding to the displayed image, and unnecessary flares from the light source 1. In addition, these configurations can reduce the change in the light amount received by the photosensor 9 and introduce a larger amount of the effective light flux (illumination light) to the light modulation element 6. The photosensor 9 can be easily installed, and the brightness and color of the light from the light source 1 can be accurately detected without adding a new optical element that allows the photosensor 9 to receive the light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each of the above embodiments can provide an illumination apparatus and an image projection apparatus using the same, in which a photosensor is easily installed and which can detect the brightness and color of the light from a light source without adding a new optical element that allows the photosensor to receive the light.

This application claims the benefit of Japanese Patent Application No. 2018-011506, filed on Jan. 26, 2018, which is hereby incorporated by reference herein in its entirety.

What is claimed is:

1. An illumination apparatus comprising:
a light source;
a polarization conversion element configured to convert light from the light source into polarized light having a specific polarization direction and to emit the polarized light to an illumination surface; and
a photosensor configured to receive light emitted from a detection surface of the polarization conversion element different from an incident surface and an exit surface of the polarization conversion element,
wherein the polarization conversion element includes:
a plurality of first polarization separation films arranged in a specific direction,
a plurality of reflection films arranged in the specific direction between the first polarization separation films, and
a second polarization separation film disposed closer to an end of the polarization conversion element in the specific direction than the first polarization separation films, and
wherein the detection surface is a surface of the second polarization separation film or a transmission surface through which light that transmits through the second polarization separation film is emitted.

2. The illumination apparatus according to claim 1, wherein the second polarization separation film is provided with one of the reflection films which is closest to the end.

3. The illumination apparatus according to claim 1, wherein the detection surface is a diffusion surface.

4. The illumination apparatus according to claim 1, wherein the second polarization separation film has a film characteristic such that a ratio of a plurality of color light fluxes included in a light flux received by the photosensor is the same as a ratio of a light flux emitted from the exit surface.

5. The illumination apparatus according to claim 4, wherein when a light amount of a first color light flux among the plurality of color light fluxes reflected by the first polarization separation film is smaller than a light amount of the first color light flux that transmits through the first polarization separation film, a light amount of the first color light flux reflected by the second polarization separation film is smaller than a light amount of the first color light flux that transmits the second polarization separation film.

6. The illumination apparatus according to claim 4, wherein when a light amount of the first color light flux among the plurality of color light fluxes reflected by the first polarization separation film is larger than a light amount of the first color light flux that transmits through the first polarization separation film, a light amount of the first color light flux reflected by the second polarization separation film is smaller than a light amount of the first color light flux that transmits the second polarization separation film.

7. The illumination apparatus according to claim 1, wherein the following conditions are satisfied:

$$0.8 \times R2 \leq T1 \leq 1.2 \times R2$$

$$0.7 \times R1 \leq T2 \leq 1.3 \times R1$$

where R1 is a ratio of an exit light amount to an incident light amount in first polarized light in the first polarization separation film, R2 is a ratio of an exit light amount to an incident light amount in second polarized light having a polarization direction different from that of the first polarized light, R1 being smaller than R2, T1 is a ratio of an exit light amount to an incidence light amount in the first polarized light in the second polarization separation film, and T2 is a ratio of an exit light amount to an incident light amount of the second polarized light.

8. An image projector apparatus comprising:
an illumination apparatus including a light source, a polarization conversion element configured to convert light from the light source into polarized light having a specific polarization direction and to emit the polarized light to an illumination surface, and a photosensor configured to receive light emitted from a detection surface of the polarization conversion element that is a different from an incident surface and an exit surface of the polarization conversion element,
wherein the polarization conversion element includes:
a plurality of first polarization separation films arranged in a specific direction;
a plurality of reflection films arranged in the specific direction between the first polarization separation films, and
a second polarization separation film disposed closer to an end of the polarization conversion element in the specific direction than the first polarization separation films, and
wherein the detection surface is a surface of the second polarization separation film or a transmission surface through which light that transmits through the second polarization separation film is emitted.

* * * * *